Sept. 23, 1930.          L. C. CROSBY           1,776,724
                             HITCH
                       Filed Dec. 19, 1929
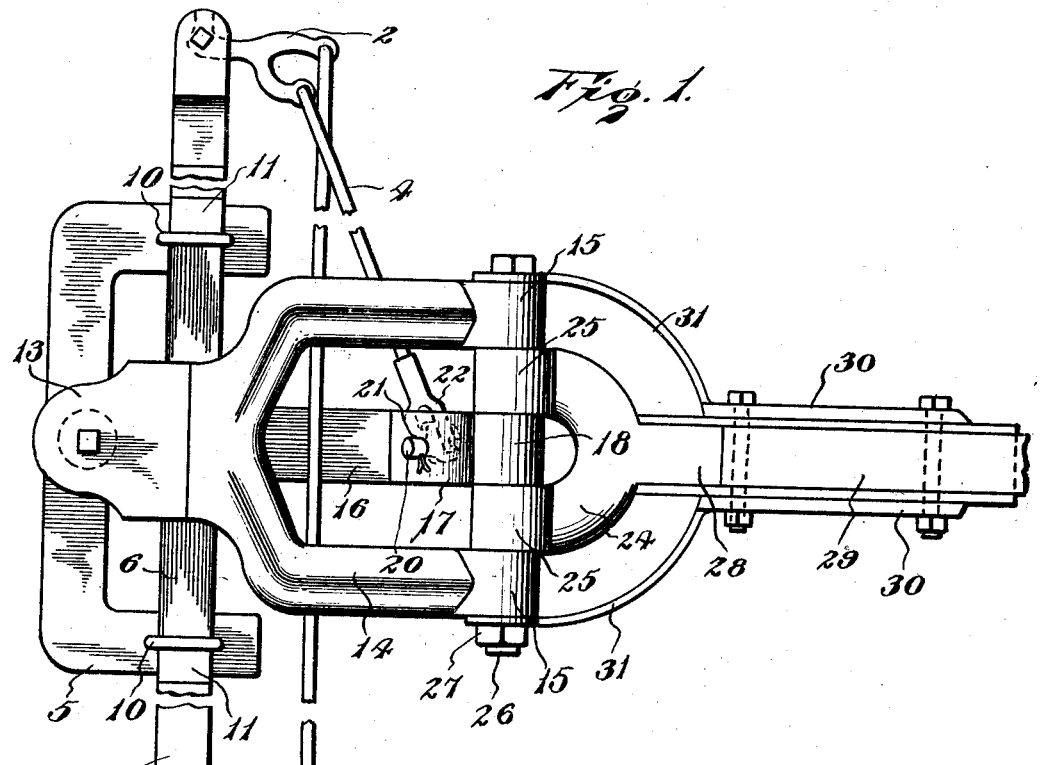
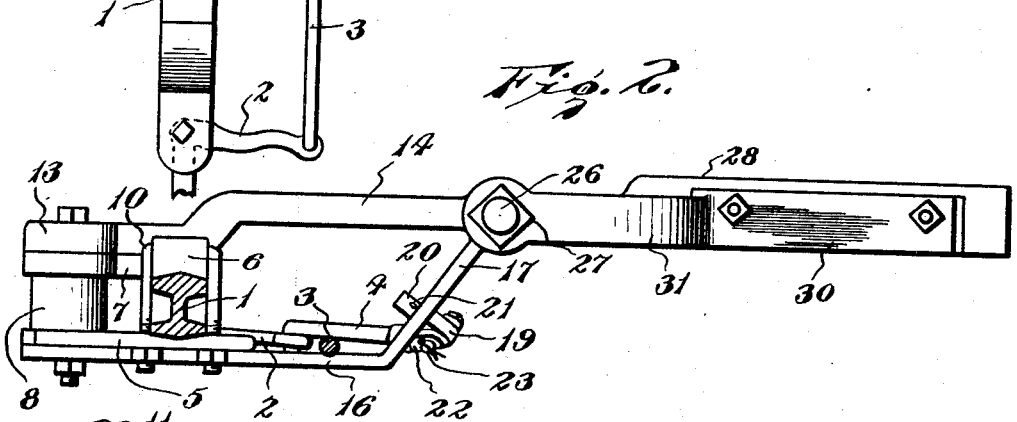
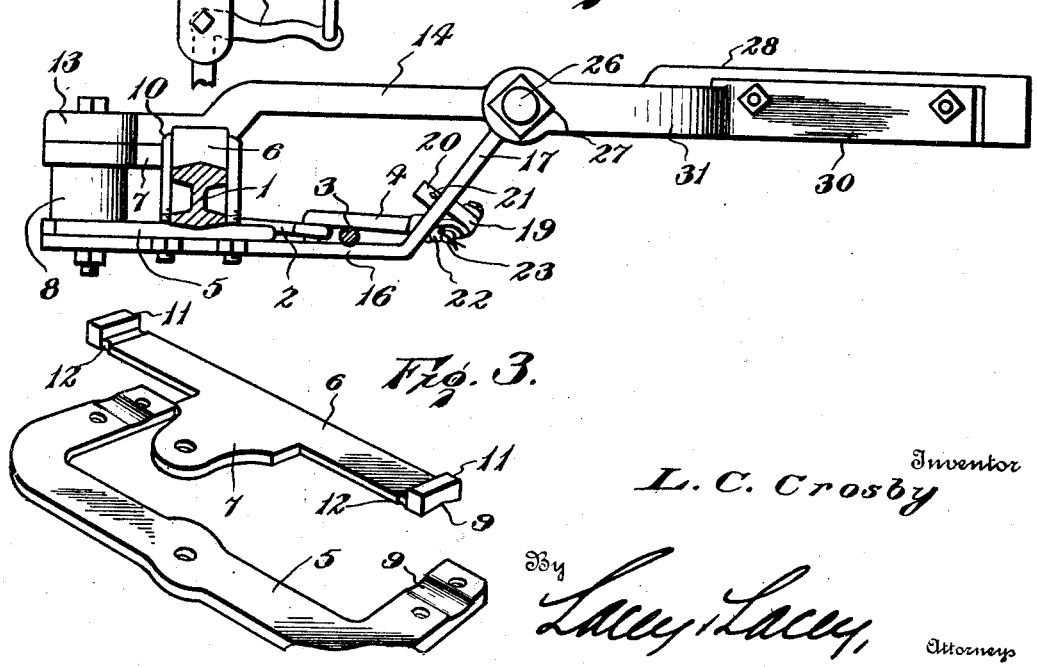
Inventor
L. C. Crosby
By Lacey & Lacey,
Attorneys Patented Sept. 23, 1930

1,776,724

UNITED STATES PATENT OFFICE

LUTHER C. CROSBY, OF CAWKER CITY, KANSAS

HITCH

Application filed December 19, 1929. Serial No. 415,303.

This invention is a device for connecting a trailer to a tractor or other vehicle and it is intended especially to provide means whereby an automobile which has been used for a long time and has become too worn to be further used satisfactorily as a pleasure vehicle may be utilized as a trailer. The invention is illustrated in the accompanying drawing and will be hereinafter fully set forth and particularly defined.

In the drawing:

Figure 1 is a plan view of my improved hitch device as it appears when in use,

Fig. 2 is a side view of the same, and

Fig. 3 is a detail perspective of the two base plates whereby the hitch device may be coupled to the axle of an automobile.

In the drawing, the reference numeral 1 indicates the front axle of an automobile. Ordinarily, the wheels are mounted upon spindles which are pivotally fitted to the ends of the axle and have spindle arms 2 extending rearwardly from the axle and connected by a tie rod 3. The tie rod 3 is disposed at the rear of the axle and to one of the spindles 2 a steering rod 4 is attached to connect the same to the steering post of the vehicle. When the tie rod is disposed at the rear of the axle, the draft upon the wheels exerts a compressing force upon the tie rod and the result is that the wheels vibrate laterally or "shimmy" when moving at a fair pace over a road which is not entirely smooth. This shimmying of the wheels renders the use of an old automobile as a trailer impracticable, but I overcome this difficulty by disconnecting the tie rod and then interchanging the wheels so that the right wheel will be mounted at the left end of the axle and vice versa, the spindle arms thereupon projecting forwardly and the tie rod being disposed in advance of the axle. In this position the draft strain upon the wheels will exert a pulling force upon the tie rod so that it is kept under tension at all times and the shimmying is overcome.

I further provide a U-shaped bar 5 which is placed against the under side of the axle and projects rearwardly therefrom, as shown in Figs. 1 and 2. An upper bar 6 is also provided and this bar has a central rearward projection 7 which terminates over the intermediate portion of the lower bar 5 so that a king bolt or pivot, indicated at 8, may be disposed between and secured to the two bars. The bars are slightly recessed at their ends, as indicated at 9, whereby they will conform to the upper and lower surfaces of the axles and they are firmly secured to the axle by U-bolts 10, as shown, the upper bar being provided with stop lugs 11 at its ends and with grooves 12 in its upper side at the bases of said lugs whereby the U-bolts will be effectually held against lateral movement. Resting upon the upper bar 6 and having a rear extension 13 which projects over the tongue or extension 7 of said upper bar is a hound 14 which projects forwardly beyond the axle and is provided with hinge eyes 15 at its front end, the extremity of the rear extension or tongue 13 being engaged with the upper end of the king bolt 8, as will be understood. There is also provided a brace 16 which is a bar extending under the axle and having its rear end pivotally engaged upon the king bolt, as will be understood upon reference to Fig. 2, the front extremity of said brace bar being turned upwardly, as indicated at 17, and formed with a hinge eye 18 alined axially with the hinge eyes 15 at the front ends of the hound 14. At an intermediate point of the upturned portion 17, a block 19 is mounted, said block having a stud 20 formed on its rear edge to pass through the portion 17 to journal therein, a cotter pin or other element 21 being provided to retain said pivot or stud in position. The block 19 has a flat top and bottom to receive a fork 22 at the inner end of the steering rod 4, said fork being pivotally connected to the block by a pin or bolt 23 in an obvious manner. When assembling the parts, the steering rod 4 is shortened and one end is threaded so that it may have the fork 22 mounted thereon. The front hound 24 has its ends formed into hinge eyes 25 which are disposed in axial alinement with and between the eyes 15 and 18, as clearly shown in Fig. 1, and a pivot bolt 26 is inserted through these axially alined eyes and equipped with a nut 27 whereby the parts will be held together. From the hound 24 a channeled bar 28 projects forwardly to receive the drawbar of a tractor or other draft implement, indicated at 29. To reinforce the channeled tongue coupling bar 28, braces 30 are secured to the sides thereof and from the rear ends of these braces hounds 31 extend to be fitted upon the ends of the pivot bolt 26 beneath the head of the bolt and beneath the securing nut 27 so that they will serve as washers therefor.

The hinge connection between the several hounds and the bracing bar 16 provide amply for accommodation of the relative vibration of the parts caused by traveling over an uneven surface while at the same time the parts are held against relative lateral movement. The hound 14 and the brace bar 16 may move laterally with respect to the axle about the king bolt 8 and this lateral movement will be transmitted to the wheel spindles 2 through the steering rod 4 and the connections 19 and 22 so that the steering of the trailer will be effected by angularly disposing the front wheels but the draft will be applied to the vehicle through the king bolt and the connections with the axle. The device is exceedingly simple in construction and composed of few parts which are simply arranged so that it constitutes a very effectual coupling between a tractor or other drawing vehicle and a trailer and an old automobile may be very efficiently utilized as a trailer by the use of the device.

Having thus described the invention, I claim:

1. Apparatus for the purpose set forth comprising in combination with an axle and a tie rod and steering rod arranged in advance of the axle, frame bars rigidly secured upon the axle and having portions disposed at the rear of the axle, a hound and a brace pivotally connected to the rear projecting portions of said bars and projecting respectively above and below the axle to a point in advance of the same, means for applying draft to the front ends of said brace and hound, and means for connecting the steering rod to the brace.

2. A draft coupling comprising a hound to extend across the top of an axle, a brace having its rear portion disposed under the axle, a pivotal connection between the rear ends of the hound and the brace and the axle, the forward portion of the brace being extended upwardly and having an eye axially alined with eyes at the front ends of the hound, a draft applying device, a pivot bolt inserted through the eyes at the front end of the hound and the brace and through said draft-applying device, a block pivotally mounted in the upturned portion of the brace, and a steering rod having its front inner end pivoted to said block and its outer end connected to the steering wheels.

3. A draft coupling comprising a hinge bolt, a hound having its rear ends pivotally mounted upon said hinge bolt and provided with a forwardly projecting bar to be secured to a draft device, a hound having its front ends pivotally mounted upon said hinge bolt and extending rearwardly, a brace having its front end pivotally mounted upon the hinge bolt between the rear ends of the draft hound and extending rearwardly, means for pivotally connecting the rearwardly extending hound with the brace and with an axle at the rear of the axle, and means for connecting a steering device to the front portion of the brace.

4. A draft coupling comprising upper and lower bars adapted to bear against the top and bottom of an axle and having portions disposed at the rear of the axle, the upper bar being provided with upwardly projecting lugs at its ends, U-bolts seated on the upper bar against the inner sides of said lugs and passing through the lower bar whereby to secure the bars rigidly to the axle, a king bolt fitted between and passing through the rear portions of said bars, a hound disposed above the axle and projecting forwardly beyond the same and having a rear extension engaged with the king bolt, a brace passing under the axle and having its rear end engaged with the king bolt and having its front end upturned to be axially alined with the front ends of the hounds, means for connecting a steering element to the upturned portion of the brace, a draft hound having its rear ends disposed in alinement with and between the front ends of the first-mentioned hound and the brace, and a pivot bolt inserted through the alined ends of the two hounds and the brace to hingedly connect the same.

In testimony whereof I affix my signature.

LUTHER C. CROSBY. [L. S.]